United States Patent [19]
Clover et al.

[11] 3,876,995
[45] Apr. 8, 1975

[54] MAGNETIC BUBBLE SWITCHES

[75] Inventors: Richmond B. Clover, Sunnyvale; Robert F. Waites, Palo Alto, both of Calif.

[73] Assignee: Hewlett-Packard Company, Palo Alto, Calif.

[22] Filed: Aug. 8, 1973

[21] Appl. No.: 386,671

[52] U.S. Cl. ...................... 340/174 TF; 340/174 SR
[51] Int. Cl. ....................... G11c 19/00; G11c 11/14
[58] Field of Search ............................... 340/174 TF

[56] References Cited

UNITED STATES PATENTS 3,786,447 1/1974 Yamauchi .................... 340/174 TF

*Primary Examiner*—James W. Moffitt
*Attorney, Agent, or Firm*—Ronald E. Grubman

[57] ABSTRACT

Magnetic bubble switches are provided for switching magnetic bubbles between permalloy tracks on which the bubbles are propagating. According to one embodiment of the invention, a current conductor is configured with one loop-like section within another to simultaneously repel magnetic bubbles from one track and attract bubbles to another track in response to a current pulse. According to another embodiment of the invention, a combination of permalloy elements is disposed at a junction of several tracks to merge two magnetic bubble streams. In reverse operation, bubbles will be reliably directed from one track to an alternate track.

7 Claims, 2 Drawing Figures

MAGNETIC BUBBLE SWITCHES

BACKGROUND AND SUMMARY OF THE INVENTION

Magnetic bubble memory devices are currently of interest for use as computer memories. Typically, magnetic bubble devices are fabricated on a wafer of a rare earth iron garnet material such as $Eu_2Er_1Fe_4GaO_{12}$. By applying an external magnetic field to the wafer, it is possible to collapse the natural magnetic domains of a particular magnetization into cylindrical domains of a stable diameter, which will be embedded in a uniform background of the opposite magnetization. The process is described in some detail by A. H. Bobeck and H. E. D. Scovil in an article entitled Magnetic Bubbles in Scientific American, June 1971. The stable cylindrical domains so created are often referred to as magnetic bubble domains, or simply magnetic bubbles. Once the bubbles have been created, they can be propagated around the magnetic wafer by means of "tracks" comprising periodic patterns of thin-film permalloy strips overlayed on the wafer. Propagation of the magnetic bubbles is accomplished by applying an external rotating magnetic field to the wafer, which polarizes different ones of the permalloy strips at different times depending on the phase of the rotating magnetic field. As the field rotates, some permalloy elements will attract a bubble while others will repel it, so that it is possible to propagate a bubble through the pattern as the magnetic field rotates. The operation of one such bubble memory device is described in detail in co-pending U.S. Pat. application Ser. No. 345,050, entitled Magnetic Bubble Propagation, filed by Richmond B. Clover, on Mar. 26, 1973, and now U.S. Pat. No. 3,848,239 and assigned to the same assignee as the present application. Information bits are represented in these devices by a sequence of magnetic bubbles propagating down the track, the presence of a bubble, for example, signifying a 1 data bit, while the absence of a bubble signifies a 0 data bit.

For practical use as a computer memory, it is often necessary to provide a means of switching magnetic bubbles from one permalloy track to another. For example, in some devices, the magnetic bubbles are generated in an unbroken string by a source on the wafer. This sequence of bubbles by itself can represent only an unbroken sequence of 1 bits so that if it is desired to represent binary information by the sequence, the information must be "written" in another manner. For example, a bubble transfer switch may be used to divert a bubble from the main track when it is desired to generate a 0 bit on that track. In the prior art, bubble transfer switches including a current carrying overlay on the magnetic wafer have been used to switch bubbles from one track to another in response to an electrical signal pulse. The current carrying overlays are typically designed in a loop configuration, so that a current pulse sent through the conductor will generate a localized magnetic field in the vicinity of the center of the loop. This field temporarily adds to the fields of the permalloy elements in that region and provides an additional attractive force on magnetic bubbles approaching the region. Thus if the loop is positioned near a junction of two different bubble tracks, the current pulse may be used to preferentially attract the bubble to one of the tracks, thereby functioning as a switch. Particularly for use as an information writing function, it is important that the bubble switch function reliably and efficiently, typical switches in the prior art requiring current of about 40–50 ma to achieve suitable reliability. It would be desirable to switch magnetic bubbles from one track to another in a reliable manner using currents significantly below those required by the switches known in the prior art.

For some purposes, it may be desirable to switch bubbles from one track to another without the use of an external current. For example, if it is desired to merge one data stream with another, there is no fundamental reason to require continual current pulsing to achieve the merger. In the prior art currentless merging of data streams has been achieved by gradually merging one permalloy track with another to form a single permalloy track. Unfortunately, in a bubble memory device including portions of the propagating tracks merged in this way, it is impossible to reverse the direction of propagation of the bubbles; if the direction were reversed, bubbles impinging on the merger point would not be deflected consistently onto one or the other of the merged tracks, but would flow one way or the other more or less randomly. The sequence of information bits propagating around the circuit would thus be irreparably degraded, rendering the device inoperative as a memory. It would therefore by extremely advantageous to have a bubble transfer switch operating without current, but which was capable of operation in a reverse direction.

In accordance with one of the illustrated preferred embodiments of the present invention, there is provided a current conductor for use at the junction of several permalloy propagating tracks, to induce the transfer of a magnetic bubble from one track to another when a current is pulsed through the conductor. The conductor is designed in a double loop-like configuration so that the same current pulse which establishes a magnetic field tending to attract the bubble toward one permalloy track, also establishes another magnetic field which tends to repel the bubble from another track at the junction. Bubbles are thus transferred reliably from one track to another using very low currents.

According to another of the illustrated embodiments of the present invention, a bubble transfer switch is provided which uses no current whatsoever. The device utilizes a unique combination of permalloy elements at a junction of several bubble propagating tracks to merge two magnetic bubble streams when the propagation is in one direction, and to reliably direct bubbles from one track to an alternate track when the propagation is in the reverse direction. According to this embodiment of the invention, the magnetic forces which attract or repel the bubbles from one track or the other are provided by the permalloy elements themselves when they are subjected to a rotating magnetic field.

DETAILED DESCRIPTION OF THE INVENTION

Figure 1:
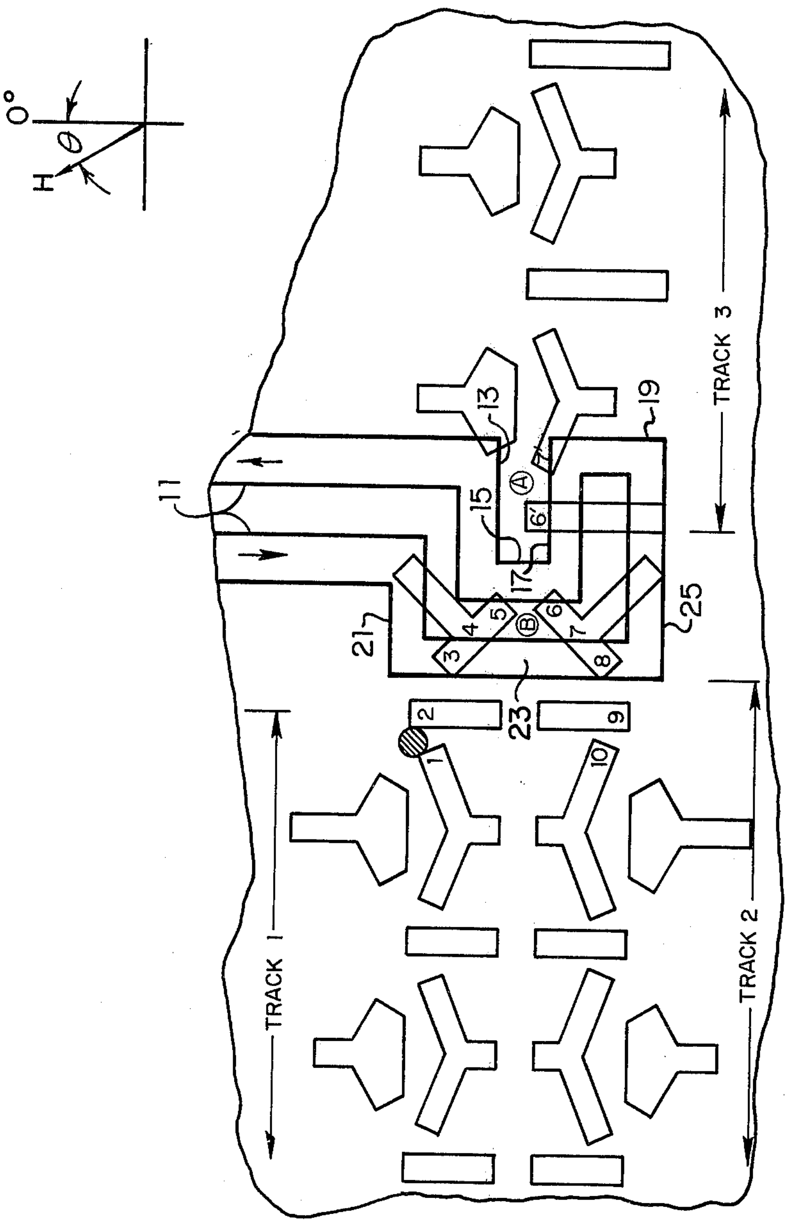
FIG. 1 shows a transfer switch in accordance with one embodiment of the invention using a double loop-like current line.

In FIG. 1 there is shown a y-shaped element of a highly permeable magnetic material (e.g., permalloy) including a pole labeled 1, and a bar-shaped element with a pole labeled 2, which are elements of a permalloy track labeled track 1 used for propagating magnetic bubbles. Also illustrated is a T-shaped element with poles labeled 3, 4, and 5. The T-shaped element is positioned with the crossbar of the T at an angle of about 45° with respect to the long direction of the bar shaped (pole 2) element. Another T-shaped element with poles labeled 6, 7, and 8, a bar-shaped element with a pole labeled 9, and a y-shaped element including a pole labeled 10 are positioned in a mirror image relation to the first three elements. The latter y-shaped and bar elements are included in a second permalloy track labeled track 2 along which magnetic bubbles are also propagated. The illustrated arrangement of the abovementioned elements constitutes a 180° corner around which bubbles circulate to effect a transfer from track 1 to track 2. Also shown is a bar-shaped permalloy element including a pole 6' positioned between the lower T-shaped element and another y-shaped element including a pole 7'. This latter y-shaped element is included in a permalloy pattern constituting a bubble track called track 3. In devices which have been constructed, typical widths of the various permalloy elements are about 3$\mu$m. Typical of the long dimensions of the permalloy elements is a length about 15$\mu$m, while spacing between the elements are about 2$\mu$m. All of these permalloy elements are on a magnetic substrate which may be fabricated e.g., from a rare earth iron garnet material such as $Eu_2Er_1Fe_4GaO_{12}$. Either overlayed on, or sandwiched between the permalloy elements and the underlying substrate is a current carrying conductor 11, which may be fabricated from a highly conducting metal such as gold. To effectuate the purposes of the invention, current carrying conductor 11 has the shape of a double loop having one loop-like section within another. More particularly, an inner loop including three linear elements 13, 15 and 17 is positioned so that the pole 6' is located in a region labeled A at about the geometric center of that loop. An outer loop including linear section 21, 23 and 25, is interconnected with the first loop by means of a linear section 19. The region near the center of this outer loop is labeled B.

In operation, a bias magnetic field is applied to a magnetic wafer to create magnetic bubbles, which for purposes of illustration may be taken as having magnetizations pointed into the plane of the drawing. A rotating magnetic field is then applied to the magnetic wafer including the illustrated permalloy elements. If the field rotates counter clockwise, magnetic bubbles will propagate from left to the right on track 1. When the rotating magnetic field is in the phase of $\theta = 0$, a typical bubble in the stream would be near the pole 2 as shown. As the magnetic field rotates through 270° the bubble progresses to the poles 3, 4, and 5, and is in the region between poles 5 and 6 when the phase of the magnetic field is 270°. If it is desirable that the bubble should propagate onto track 2, no current is pulsed through the current carrying line. In that case as the field continues rotating the bubble moves to the poles 6, 7, and 8, finally reaching the vicinity of pole 9 when the magnetic field reached a phase of 540° (i.e., a phase of 180° during a second period of rotation). As the magnetic field continues rotating, the bubble progresses to pole 10 and thence to the left along track 2.

However, if it is desired instead to switch the bubble from track 1 to track 3, an alternate procedure is followed. When the phase of the magnetic field is at 270° (the bubble then being located in the region between poles 5 and 6) a current is sent through conductor 11 in the direction indicated by the arrow. This current pulse induces a magnetic field in the garnet substrate in the region denoted A, which tends to attract the bubble toward pole 6'. When the magnetic field reaches 360° the bubble will be attracted into the region of pole 6' by the combined field of pole 6' and the current loop, and as the field continues rotating, the bubble will progress to pole 7' and thence continue along track 3. Also contributing to the switching action of the device is the large current loop including sections 21, 23, and 25. As the applied current pulse flows through the larger loop, a magnetic field which is opposite in direction to the field established in the region A is created in the region denoted B. This field tends to repel the magnetic bubble away from the poles 5 and 6 toward the pole 6' thereby augmenting the forces tending to switch the bubble from track 1 to track 3. By means of the doubleloop configuration, the invention uses a single current pulse to provide an attractive force in one region supplemented by a repulsive force in another region acting to induce a smooth and reliable bubble transfer with minimum current.

Figure 2:
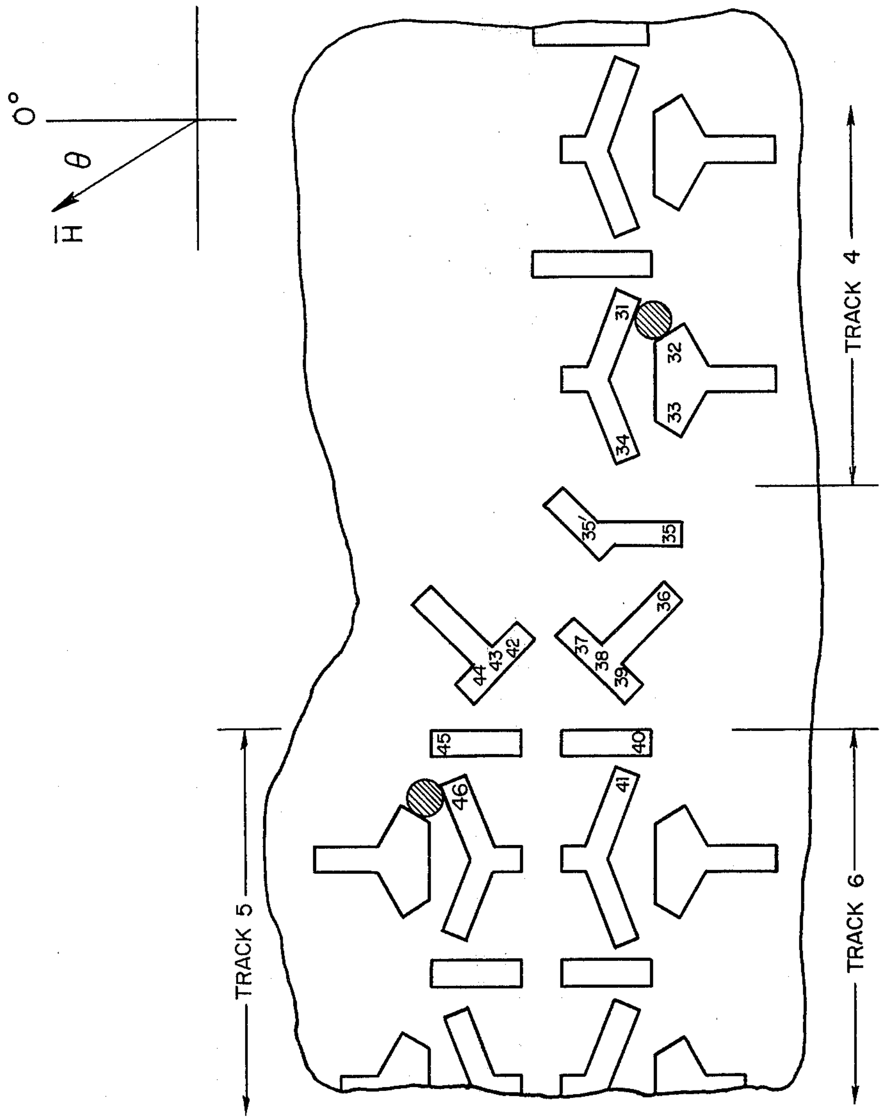
FIG. 2 illustrates a currentless transfer switch in accordance with another embodiment of the invention.

In FIG. 2 there are shown several permalloy elements of a magnetic bubble track labeled track 4. The terminal elements of this track include poles labeled 31, 32, 33, and 34. Also shown in the figure is a track labeled track 5 including a y-shaped element with a pole 46, positioned adjacent to a recentagular element with a pole 45. In a similiarly fashioned configuration, track 6 includes an element with a pole 41 positioned adjacent to a rectangular element including a pole 40. A T-shaped permalloy element including poles 42, 43, and 44 is positioned with a cross-bar of the T at an angle of about 45° to the element including pole 45. Another T-shaped element including poles 36, 37, 38, and 39 is positioned with its cross-bar at an angle of about 45° to the element including pole 40. The symmetrical arrangement of the two T-shaped elements constitutes a 180° corner linking tracks 5 and 6. Track 4 is conjoined with tracks 5 and 6 by means of a permalloy element including poles labeled 35 and 35'. The section including pole 35 is positioned parallel to the element including pole 40, while the section including pole 35' is positioned about parallel to the cross-bar of the T-shaped element including poles 37, 38 and 39. All of these elements, as well as the spacing between them are of dimensions described above in connection with FIG. 1.

In operation, a magnetic bubble advancing to the left on track 4 will be in the vicinity of pole 31 when the phase of an external rotating magnetic field is at 180°. As the external rotating field advances through 360° (i.e., to 540°) the magnetic bubble successively traverses the poles 32, 33, 34, and will be in the vicinity of pole 35 when the magnetic field is at 540°. As the rotating magnetic field advances through another period, the magnetic bubble advances onto the T-element in the vicinity of pole 36 and progresses up the T-element around to pole 37, thence back to pole 38, and pole 39, the bubble being in the vicinity of pole 40 when the field has advanced through one period. As the rotating field advances again, the bubble will progress to pole 41 and thence to the left on track 6. Thus, the bubble is switched from track 4 to track 6. Another bubble progressing to the right on track 5 will move from pole 46 to pole 45 and progress around the loop through poles 44, 43, 42, 37, 38, and 39 to pole 40, and thence onto track 6 as the magnetic field rotates through 540°, thereby effecting a transfer from track 5 to track 6. Thus, a data stream on track 4 may be merged with another data stream on track 5 to produce a combined data stream on track 6. The merger is effected entirely without the use of current carrying conductors or external signals.

Suppose now that the external magnetic field is rotated in the opposite direction (i.e., clockwise.) Then the direction of propagation of the magnetic bubbles on the chip will be reversed. Referring to FIG. 2, magnetic bubbles will propagate to the right on track 6, thereby entering the loop at the pole 40. As the magnetic field rotates, the bubbles will progress onto pole 39, thence to pole 38 and 37. When the pole 37 is attractive, pole 35′ is repulsive, so that as the field continues rotating and pole 42 becomes attractive, the magnetic bubble will progress to pole 42 and thence to pole 43, 44, 45, and 46. It will then propagate to the left down track 5. Since pole 35′ will always be repulsive when pole 37 is attractive, bubbles will never transfer onto track 4, but will always progress around the loop to track 5. The device may therefore be operated reliably with a reverse propagation direction. Again, no current lines are required for the operation.

We claim:

1. A transfer switch for use in conjunction with a plurality of magnetic bubble propagating tracks on a magnetic wafer to transfer magnetic bubbles between different ones of said propagating tracks, said transfer switch comprising:

magnetic element means adjacent to first and second propagating tracks for guiding magnetic bubbles therebetween; and a current line on said magnetic wafer including an outer loop-like section and an inner loop-like section disposed within a portion of said outer loop-like section, said current line operating in response to a current pulsed therethrough to generate magnetic fields which simultaneously repel magnetic bubbles from said magnetic element means and attract magnetic bubbles to a third propagating track, thereby switching magnetic bubbles from one of said first and second propagating tracks to said third propagating track.

2. A transfer switch as in claim 1 wherein said magnetic element means comprises a pair of T-shaped elements of magnetic material symmetrically disposed adjacent to said first and second propagating tracks for guiding magnetic bubbles therebetween.

3. A transfer switch as in claim 2 wherein said magnetic element means are of permalloy.

4. A transfer switch for use in conjunction with a plurality of magnetic bubble propagating tracks on a magnetic wafer and a rotating magnetic field applied to the wafer, said transfer switch comprising a plurality of elements of a magnetic material disposed at a junction of said propagating tracks for switching magnetic bubbles incident at said junction from first and second propagating tracks to a third propagating track only in response to said magnetic field rotating in one direction, and switching magnetic bubbles incident at said junction from said third propagating track to said first propagating track only in response to said magnetic field rotating in another direction opposite said one direction.

5. A transfer switch as in claim 4 wherein said plurality of elements of a magnetic material comprises a pair of T-shaped elements adjacent to said first and third propagating tracks for guiding magnetic bubbles therebetween, and a third element for operation in response to said magnetic field rotating in said one direction to attract magnetic bubbles incident at said junction from said second propagating track to one of said pair of T-shaped elements, and in response to said magnetic field rotating in said other direction to repel magnetic bubbles incident at said junction from said third propagating track away from said second propagating track.

6. A transfer switch as in claim 5 wherein said third element includes a first rectangular shaped section positioned substantially parallel to the cross bar section of said one T-shaped element, and a second rectangular section joined to one end of said first rectangular section.

7. A transfer switch as in claim 6 wherein said plurality of elements of a magnetic material are of permalloy.

* * * * *